_(12)_ United States Patent
Holla et al.

(10) Patent No.: US 10,476,801 B1
(45) Date of Patent: Nov. 12, 2019

(54) DYNAMIC DISTRIBUTION OF RSS ENGINES TO VIRTUAL MACHINES BASED ON FLOW DATA

(71) Applicant: NICIRA, INC., Palo Alto, CA (US)

(72) Inventors: Aditya G. Holla, Palo Alto, CA (US); Shrikrishna Khare, Sunnyvale, CA (US); Rajeev Nair, Newark, CA (US); Aditya Sonthy, Milpitas, CA (US); Wenyi Jiang, Palo Alto, CA (US); Rishi Mehta, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/965,226

(22) Filed: Apr. 27, 2018

(51) Int. Cl.
*H04L 12/803* (2013.01)
*H04L 29/08* (2006.01)
*H04L 12/721* (2013.01)

(52) U.S. Cl.
CPC ............ *H04L 47/125* (2013.01); *H04L 45/66* (2013.01); *H04L 67/2842* (2013.01)

(58) Field of Classification Search
CPC .................................................... H04L 47/125
See application file for complete search history.

(56) References Cited

U.S. PATENT DOCUMENTS

| 2012/0207175 | A1* | 8/2012 | Raman | H04L 47/125 |
| | | | | 370/412 |
| 2013/0103871 | A1* | 4/2013 | Domsch | G06F 9/5005 |
| | | | | 710/267 |
| 2018/0159771 | A1* | 6/2018 | Malloy | H04L 45/7453 |
| 2018/0285151 | A1* | 10/2018 | Wang | G06F 9/4881 |

OTHER PUBLICATIONS

Vmware, Inc. "ESXi the Purpose Built Bare Metal Hypervisor", https://www.vmware.com/products/esxi-and-esx.html, dated 2017, 9 pages.

* cited by examiner

*Primary Examiner* — Kevin M Cunningham
(74) *Attorney, Agent, or Firm* — Hickman Palermo Becker Bingham LLP; Malgorzata A. Kulczycka

(57) ABSTRACT

An approach for dynamically distributing RSS engines to virtual machines based on flow data is disclosed. A method comprises receiving first absolute counts of data packets that belong to at least one data flow. Flow load indicator values are computed based on the first absolute counts, and stored in a lookup table. A sorted table is generated by sorting entries of the lookup table. A first count of filters that can be applied on RSS engines is determined. A second count of data flows in the sorted table and having corresponding flow load indicator values exceeding a threshold value is determined. If the second count exceeds the first count, then the first count of data flows is selected from the sorted table. The first count of filters that correspond to the data flows is determined, and the first count of the filters is assigned to at least one RSS engine.

20 Claims, 5 Drawing Sheets

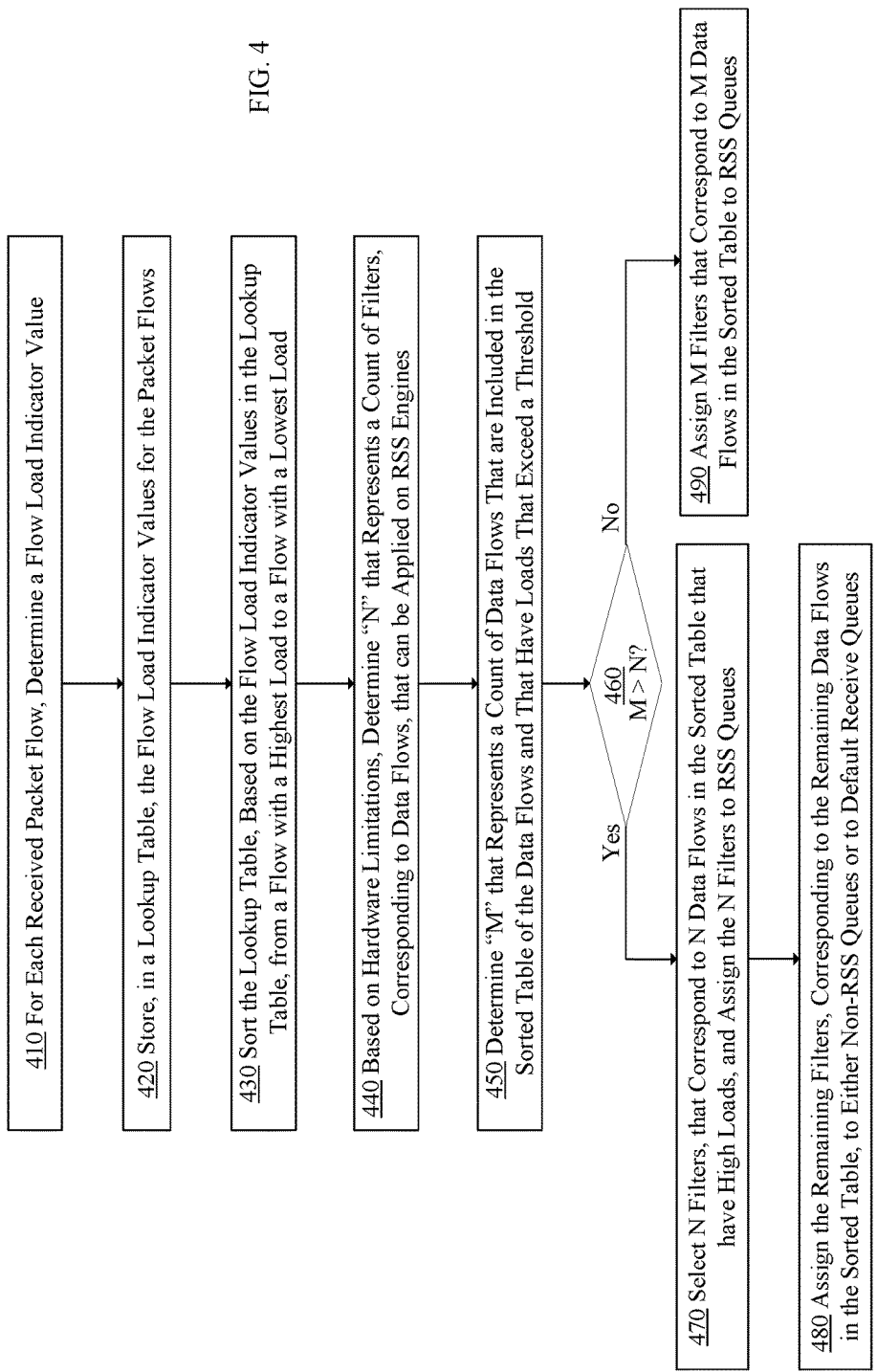

DYNAMIC DISTRIBUTION OF RSS ENGINES TO VIRTUAL MACHINES BASED ON FLOW DATA

BACKGROUND

A Netqueue feature in a hypervisor provides different algorithms to effectively utilize physical network interface card (NIC)'s receive (Rx) queues. Physical MC provides Rx queue features such as receive side scaling (RSS), large receive offload (LRO), latency-sensitive, and Netqueue encapsulates these queue capabilities and makes best attempt to distribute Rx-filters of the clients such as virtual NIC and VM kernel NIC on these Rx queues, activating only required number of Rx queues with required queue feature. In turn, physical NIC tries to match incoming packet against applied Rx-filters. Further processing of that packet is done at the central processing unit (CPU) associated with corresponding Rx-queue. Thus, processing is scaled to multiple CPUs. Netqueue algorithms are based on load calculation. They calculate the load of the filters (based on its transmit (Tx), Rx packet rate), and assign them a Rx queue.

Rx queues are of two types. For the first type, a driver exposes a single Rx queue to a networking stack of a hypervisor. The Rx queue is mapped to single hardware Rx queue, and it accepts Rx-filters (such as MAC based filters or combination of outer, inner MAC). If the incoming packets matches any of those applied filters, then further packet processing is done on that Rx queue. Netqueue layer present in a hypervisor could allocate such Rx queues with additional features like LRO and latency sensitive. Another type is where a driver exposes a single Rx queue with Receive Side Scaling (RSS) feature, which is backed by multiple hardware queues. This pool of queues backing up the single Rx queue with a RSS feature is referred to as RSS engine or RSS pool. Netqueue layer in a hypervisor allocates such Rx queue with RSS feature and applies filter on them. If the incoming packets matches any of those applied filters, then one more level of queue-selection is done. This selection process is done by executing RSS hash algorithm supported by the hardware (such as Toeplitz hash function) on selected fields of the packet. Output of this function is a hash-value that is used as selection criterion to decide the hardware queue in the pool to process this packet. Some devices further provide indirection table that is mapped with different queues for different hash values. Hardware will execute the packet with particular hash value on the queue mentioned in the table.

Currently, physical NICs expose a single RSS queue to the operating system which represents a pool of hardware queues (number of hardware queues typically ranges from 8-16). And, in a hypervisor one may apply filters belonging to virtual kernel network interface cards (management, infrastructure traffic (NFS, vMotion, vSAN, VTEP)) to this RSS queue. Also end user can anticipate some of service VMs (such as Edge Service Gateway in NSX) as high t-put VM and statically request for RSS queue for them.

SUMMARY

Techniques are described herein for dynamically distributing RSS engines to virtual machines based on flow data. The approach utilizes the RSS engines because they are well suited for the infrastructure traffics, the virtual machine traffics that expect high throughputs, and the virtual machine traffics that carry multiple highly-loaded flows.

In an embodiment, an approach allows to dynamically determine a count of loaded data flows that have been observed on a virtual network interface card (vNIC). The count of the loaded flows is used to determine whether the data flow filters, corresponding to the loaded data flows, may be assigned to RSS engines.

Data flow filters are assigned to RSS engines dynamically. The process includes periodically retrieving absolute counts of data flow packets that have been observed on a vNIC. The retrieved absolute counts are used to compute flow load indicator values for the data flows. The flow load indicator values are used to determine whether, or how, the data flow filters, corresponding to the data flows, may be assigned to the RSS engines. Both the retrieving of the absolute counts and the computing of the indicator values are performed periodically. Therefore, the distribution of the RSS engines to the data flow filters is also performed periodically. Hence, the assignments of the data flow filters to the RSS engines are created and updated dynamically.

When a data flow is observed in a networking stack of a hypervisor, different layers of the hypervisor may register their own action callbacks for the data flow. The action callbacks may be executed with respect to the future data packets of the observed data flow.

In an embodiment, an approach for assigning, and reassigning, data flow filters to RSS engines is implemented by adding a new action callback for every new data flow transmitted from an uplink towards a virtual machine. The action callbacks added for the new data flows may be configured to monitor absolute load values for the data flows.

Absolute counts of data flow packets may be retrieved from flow cache. The flow cache may be implemented in a hypervisor, and particular in a virtual switch. The flow cache may be configured to monitor the network data flows transmitted via the virtual switch. The absolute counts may be retrieved from the flow cache by a netqueue load balancer of a hypervisor, and stored in a data structure.

Absolute counts of data flow packets may be used to compute moving average values for the corresponding data flows observed at discrete time intervals. The moving average value may be computed to preserve the history of the data flow traffic within several processing cycles. The moving average values for the observed data flows may be stored in a lookup table and used to determine load values for the corresponding data flows. The moving average values are also referred to as flow load indicator values.

Once the flow load indicator values are stored in the lookup table, a netqueue layer implemented in a hypervisor determines a count of data flows for which the corresponding load values exceed a threshold value. This may be performed for each destination MAC address learned on the virtual switch. The destination MAC addresses associated with corresponding data flows are referred to as filters.

The netqueue layer may sort the entries in the lookup table in a descending order based on the flow load indicator values from a flow with a highest load value to a flow with a lowest load value. The netqueue layer may also determine a count of filters that may be applied on RSS engines. Based on the sorted lookup table, the count of the flows that exceed the threshold value, and the count of the filters that may be applied on the RSS engines, certain filters are selected and assigned to some RSS engines. The filters occupying an RSS queue, but not having a minimal number of loaded flows, are removed from the RSS queue to either a non-RSS queue or to default Rx queue.

BRIEF DESCRIPTION OF THE DRAWINGS

In the drawings:

FIG. 4 depicts an example flow chart for dynamically assigning filters to RSS engines;

DETAILED DESCRIPTION

In the following description, for the purposes of explanation, numerous specific details are set forth in order to provide a thorough understanding of the presently described method. It will be apparent, however, that the present approach may be practiced without these specific details. In other instances, well-known structures and devices are shown in a block diagram form to avoid unnecessarily obscuring the present approach.

Certain embodiments as described below extend the RSS queue resources availability to all virtual machines. It includes an algorithm to retrieve the flow statistics about each of the mac learned in virtual switch and further utilize this information to decide the candidates for RSS queues.

RSS queues are ideally well suited for the infrastructure traffics or those VMs which expects high throughput, or to a VM which has multiple loaded flows. One embodiment relates to a method for regular VMs to dynamically find out if it has many loaded flows observed on its virtual network interface card, and to decide, based on the number, if RSS queue is needed or not.

(a) in one embodiment, a virtual switch has a component called "Flow Cache". This component is responsible for observing different network flows in a virtual switch. When a new flow is observed in a networking stack of they hypervisor, each of different layers registers its own action callback for this flow with flow cache. And, for all future packets of this flow, flow cache will execute these action callbacks.

(b) in one embodiment, the virtual switch is enhanced with a new action callback for every new flow detected from uplink towards the VM. As part of this action callback, the load of this flow is monitored. This load is calculated as moving average based on number of packets and bytes observed on this flow between pre-defined interval of time. As this is a moving average value, it preserves history of past few runs.

(c) in one embodiment, during regular cycle, a netqueue layer asks virtual switch for number of flows exceeding threshold load for each MAC learned on the virtual switch. Netqueue layer notes down this number in the filter datastructure corresponding to that MAC.

(d) in one embodiment, the netqueue layer further sorts the list of filters in descending order of the number of loaded flows observed on them.

(e) in one embodiment, based on the sorting list, filters are selected for RSS queue.

(f) in one embodiment, filters occupying RSS queue but not having a minimal number of loaded flows are moved back from an RSS queue to either non-RSS queue or to default Rx queue.

Figure 1:
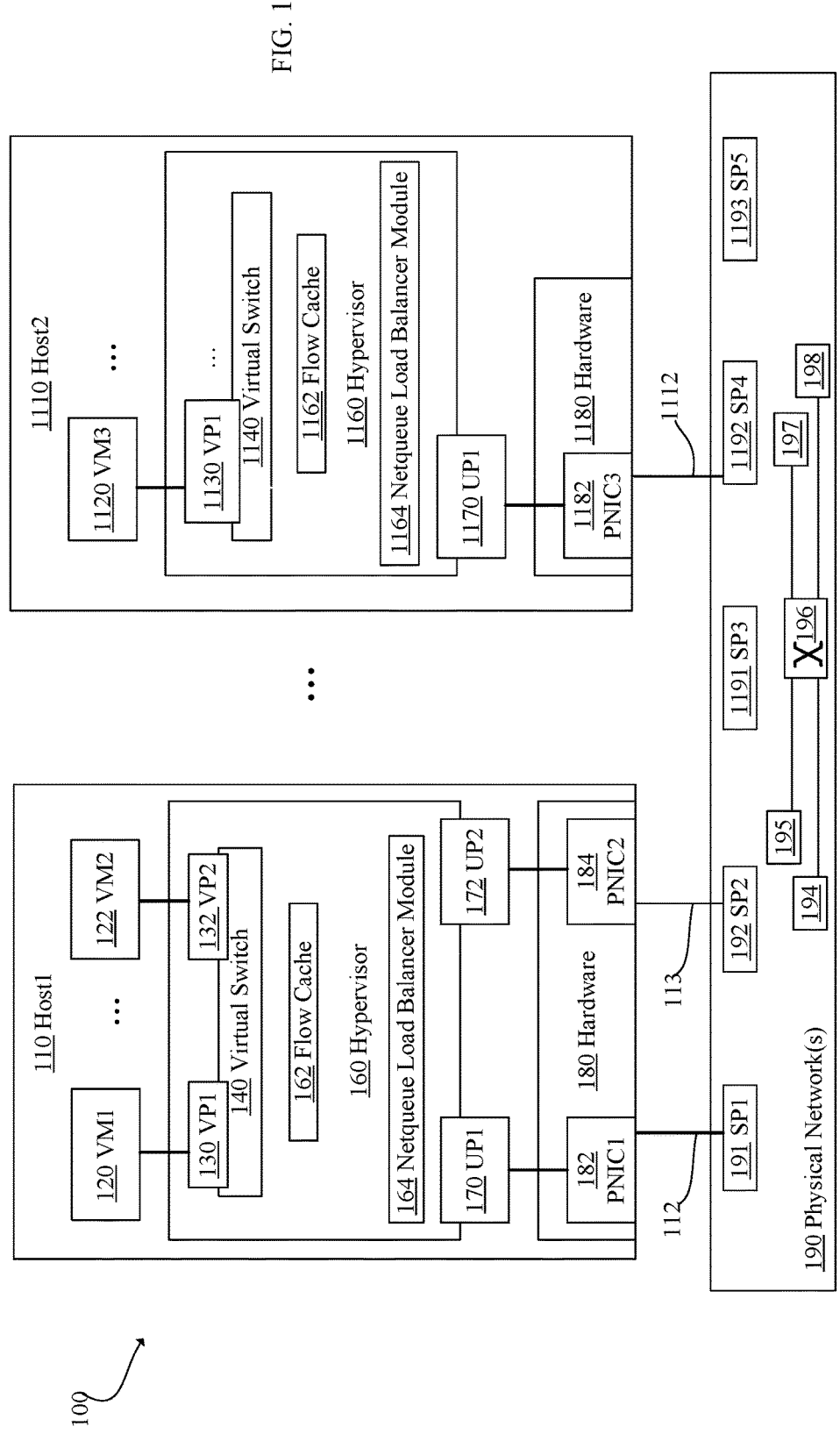
FIG. 1 is a block diagram depicting an example system architecture for dynamic distribution of RSS engines to virtual machines based on flow data.

Example System Architecture for a Dynamic Provisioning of Multiple RSS Engines FIG. 1 is a block diagram depicting an example system architecture 100 for dynamic distribution of RSS engines to virtual machines based on flow data. In the depicted example, example system architecture 100 includes two or more hosts 110, 1110, and one or more physical networks 190.

Host 110 may include a hypervisor 160, hardware components 180, and other components not depicted in FIG. 1. Host 110 includes a virtualization layer that abstracts processor, memory, storage, and networking resources of hardware 180 of the host machine 110 into one or more virtual machines ("VMs") 120 ... 122 that run concurrently on host 110. VMs 120-122 run on top of the virtualization layer, referred to herein as a hypervisor 160, which enables sharing of the hardware resources by VMs 120-122. Hypervisor 160 may include a virtual switch 140, and may provide connectivity to and from one or more virtual machines. FIG. 1 depicts that host 110 hosts two virtual machines VM 120, VM2 122. However, host 110 may host as many virtual machines as the configuration of the host allows for.

Host 1110 may include a hypervisor 1160, hardware components 1180, and other components not depicted in FIG. 1. Hypervisor 1160 may include a virtual switch 1140, and may provide connectivity to and from one or more virtual machines. FIG. 1 depicts that host 1110 hosts one virtual machine VM 1120. However, host 1110 may host as many virtual machines as the configuration or the host allows for.

Hardware components 180/1180 may include hardware processors, memory units, data storage units, and physical network interfaces, some of which are not depicted in FIG. 1. Hardware components 180/1180 may also include physical network interface controllers, such as PNIC1 182, PNIC2 184, PNIC3 1182, that may provide connectivity to routers and switches of physical networks 190. PNICs are described in detail in FIG. 2.

Hypervisors 160, 1160 use uplinks 170, 172, 1170, respectively, to provide connectivity to and from PNICs 182, 184, 1182, respectively.

Hypervisor 160/1160 may be configured with flow cache 162/1162, respectively. Flow cache 162/1162 is used to store absolute counters for data flow packets that have been processed by the respective hypervisors. The counter values are periodically retrieved from flow cache 162/1162 by netqueue load balancer module 164/1164. Once netqueue load balancer module 164/1164 retrieves the counter values from flow cache 162/1162, netqueue load balancer module 164/1164 uses the retrieved information to compute flow load indicator values for the corresponding data flows.

Hypervisor 160/1160 may be implemented as a software layer that supports execution of multiple virtualized computing instances of virtual machines. Hypervisor 160/1160 may include components that implement an approach for a dynamic provisioning of multiple RSS engines. For example, hypervisor 160/1160 may include components for generating, dynamically updating, and maintaining a mapping table that includes mapping entries for mapping destination MAC addresses of data flow packets onto identifiers of logical queues, which may identify RSS engines of corresponding hardware queues. The mapping table may be used to direct incoming data packets to corresponding logical queues implemented in system architecture 100. For example, upon receiving a data packet, a destination MAC address may be extracted from the packet, and used as a search key to lookup the mapping table to determine an identifier of logical queue that corresponds to the destination MAC address.

Hypervisor 160/1160 may also include components for generating, dynamically updating, and maintaining one or more indirection tables. An indirection table is a table that includes mappings from hash values onto identifiers of hardware queues implemented in RSS engines. Usually, each RSS engine has its own indirection table. Upon receiving a data packet and determining, based on a mapping table, a logical queue that corresponds to a destination MAC address included in the packet, a hash value from contents of selected fields of the packet may be computed. The computed hash value may be used as a search key to lookup the indirection table associated with the logical queue to determine an identifier of a hardware queue for queuing the packet. The identifier is used to identify a corresponding hardware queue. Subsequently, the data packet is queued into the corresponding hardware queue. Examples of indirection tables are described in FIG. 3-4.

Virtual switch 140/1140 may be configured to monitor and manage data traffic that is communicated to and from hypervisor 160/1160, respectively. Virtual switch 140/1140 may be implemented as a kernel component of hypervisor 160/1160, respectively, or as an entity that is separate from hypervisor 160/1160, but that communicates with hypervisor 160/1160.

Implementations of virtual switch 140/1140 may vary and may depend on a type of product in which the switch is deployed as a virtualization medium. For example, virtual switch 140/1140 may be implemented as part of hypervisor 160/1160, as it is depicted in FIG. 1, and as it is in the vSphere® and KVM® lines of products. Alternatively, although not depicted in FIG. 1, a virtual switch may be implemented as a hardware component, or as part of a user space, or within a privileged virtual machine. Examples of such implementations include the Hyper-V® and Xen® lines of products.

Virtual machines, including VMs 120/122/1120, may be realized as complete computational environments. The virtual machines contain virtual equivalents of hardware and software components of the physical computing systems. Virtual machines may be instantiated as virtualized computing instances. The instances may be equipped with their own resources, may be assigned their own workloads, and may be configured to perform their own tasks assigned to the workloads. Virtual resources allocated to the virtual machines may include virtual CPUs, virtual memory, virtual disks, virtual network interface controllers and the like. The virtual machines may be configured to execute guest operating systems and guest applications.

A virtualized computing instance may be realized as a hardware virtualization and/or a software virtualization. As a hardware virtualization, the instance may represent for example, an addressable virtual machine. As a software virtualization, the instance may be used to provide for example, an isolated user space instance. Virtualized computing instances may include containers running on a top of host operating systems, virtual private servers, client computers, and hybrid combinations of thereof.

Physical networks 190 may include local area networks and/or wide area networks, and may utilize various hardware and software configurations. For example, physical networks 190 may include one or more routers 194, 195, 197, 198, one or more switches 196, and one or more switch ports 191, 192, 1191, 1192, and 1193. Physical networks 190 may also include other components that are not depicted in FIG. 1.

Example Logical Queues and Example Hardware Queues

Figure 2:
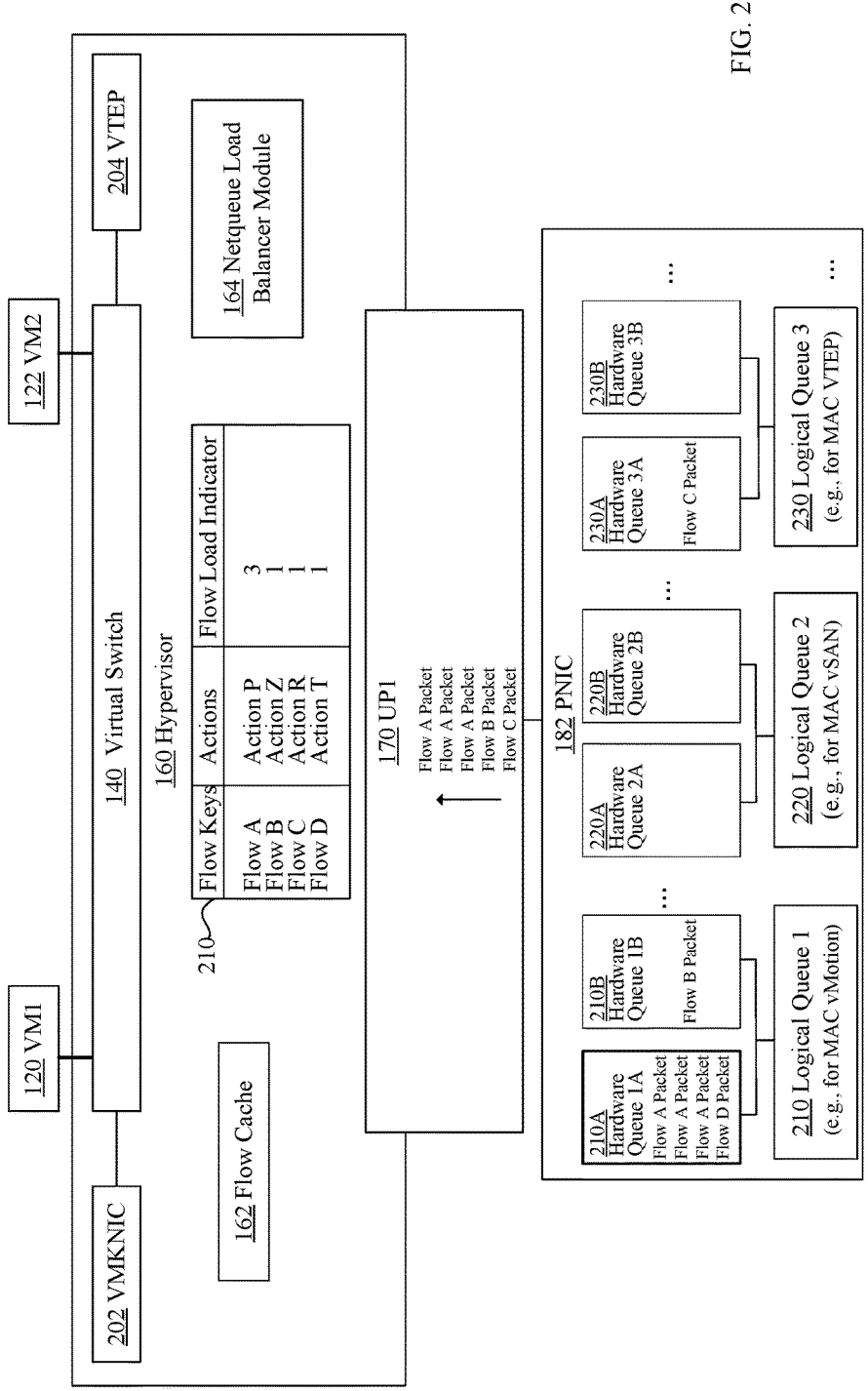
FIG. 2 is a block diagram depicting an example lookup table for storing associations between packet flow identifiers, corresponding actions, and corresponding flow load indicator values.

FIG. 2 is a block diagram depicting an example lookup table 210 for storing associations between packet flow identifiers, corresponding actions, and corresponding flow load indicator values. FIG. 2 also depicts PNIC 182, which may be configured to implement logical queues. The logical queue is also referred to as an RSS queue. Each logical queue is associated with its own RSS engine, also referred to as an RSS pool. Each RSS pool may have one or more hardware queues.

In the depicted example, PNIC 182 is configured to implement three logical queues. The logical queues are used to identify RSS engines having corresponding hardware queues. The depicted queues include a logical queue 210, a logical queue 220, and a logical queue 230. However, PNIC 182 may implement as many logical queues as the configuration of PNIC 182 allows for.

An initial assignment between traffic flows and logical queues may be defined using a mapping table (not depicted in FIG. 2). A mapping table may include mappings between destination MAC addresses of incoming data packets and identifiers of the logical queues. For example, a mapping table may include a mapping from a MAC address indicating a vMotion flow as a destination to an identifier of a logical queue 1, a mapping from a MAC address indicating a vSAN flow as a destination to an identifier of a logical queue 2, and a mapping from a MAC address indicating a VTEP flow as a destination to an identifier of a logical queue 3. A mapping table may also include one or more empty slots.

Continuing with the above example, the data packets that include a MAC address of the vMotion flow, which is destined to a virtual kernel network interface card (vmknic) 202, may be mapped onto logical queue 210; the data packets that include a MAC address of the vSAN flow, which is destined to vmknic 202, may be mapped onto logical queue 220; and the data packets that include a MAC address of a VTEP flow, which is destined to a VTEP 204 and subsequently to VM1 120 and/or VM2 122, may be mapped onto logical queue 230. Other mapping entries may also be included in the mapping table maintained by PNIC 182.

Logical queues are also referred to as RSS queues. Each logical queue is associated with its own RSS engine, also referred to as an RSS pool. Each RSS pool may have one or more hardware queues.

Typically, a logical queue is associated with an RSS pool of 8 to 16 hardware queues. Merely to illustrate clear examples, FIG. 2 depicts that each of the logical queues 210, 220, 230 includes two dedicated hardware queues. However, logical queues may be configured with as many hardware queues as the configuration of PNIC 182 allows for.

In the depicted example, logical queue 210 is associated with a pool of two hardware queues, including a hardware queue 210A and a hardware queue 210B. Logical queue 220 is associated with a pool of two hardware queues, including a hardware queue 220A and a hardware queue 220B. Logical queue 230 is associated with a pool of two hardware queues, including a hardware queue 230A and a hardware queue 230B.

The described example configuration of PNIC 182 is not be viewed as limiting in any way because additional logical queues, additional hardware pools and additional hardware queues may be implemented in PNIC 182.

Netqueue Load Balancer

A netqueue feature is configured to distribute data packets to different physical queues, and to assign separate hypervisor threads to packet processing of individual data flows. The netqueue feature operates on MAC address filters, which means that data packets destined to same MAC address will be processed by the same queue. The netqueue monitors virtual network interface cards (vNICs) as they receive packets from the corresponding queue, and distribute the data packets to the queues based on flow data. A single vNIC with multiple flows may use multiple queues.

Netqueue may implemented a networking load balancer module. The network load balancer module may be configured to distribute RSS engines to virtual machines. To distribute the RSS engines, the netqueue may utilize information retrieved from the flow cache and information stored in a lookup table. FIG. 1-2 depict an example of flow cache 162/1162, and an example netqueue load balancer module 164/1164.

Lookup table 210 is a data structure that may be used to store associations between packet flow filters, actions to be performed with respect to the corresponding packet flows, and flow load indicator values for the corresponding flows. Lookup table 210 may be organized in many ways. For example, lookup table 210 may be organized as a data structure that includes cells for storing data, a data structure that includes cells for storing pointers to the data, and the like.

Example Lookup Table

An example lookup table 210, depicted in FIG. 2, stores associations between packet flow filters, corresponding actions, and corresponding flow load indicator value. Lookup table 210 may be implemented in hypervisor 160, and may be generated as data flows are provided to PNIC 182 and then to uplink 170. In the depicted example, several flow A packets, a flow B packet, and a flow C packet are provided to uplink 170.

In an embodiment, example lookup table 210 is organized as a data structure comprising rows and columns. The rows may correspond to particular entries stored for particular data flows. The columns may include a column for storing flow keys for the data flows, a column for storing action identifiers of the actions to be performed with respect to the corresponding data flows, and a column for storing flow load indicator values determined for the data flows. Lookup table 210 may also include additional columns not depicted in FIG. 2.

FIG. 2 also depicts a flow cache 162 and a netqueue load balancer module 144. Flow cache 162 maintains absolute counters determined for data flow packets that have been processed. The counter values are periodically retrieved by netqueue load balancer module 144. Once netqueue load balancer module 164 retrieves the counter values from flow cache 162, netqueue load balancer module 164 uses the retrieved information to compute flow load indicator values for the corresponding data flows. For example, upon retrieving, at time $t_1$ and time t2, the counter values for a flow A, a flow B, a flow C, and a flow D, netqueue load balancer module 164 may use the two sets of counter values to compute flow load indicator values for the flows A-D. The flow load indicator values for the flows may be computed using different approaches. One of the approaches is described in FIG. 3.

Netqueue load balancer module 164 may be configured to retrieve counter values from flow cache 162 periodically every 5 seconds, 10 seconds, or any other time interval. As the new counter values are retrieved, netqueue load balancer module 164 may compute new flow load indicator values and update lookup table 210 by overwriting the old flow load indicator values with the new flow load indicator values.

Netqueue load balancer module 164 may be configured to create a new entry in lookup table 210. For example, if netqueue load balancer module 164 retrieves counter values from flow cache 162 at a given time slot, and the retrieved information includes a counter value for a data flow for which no entry has yet been created in lookup table 210, then netqueue load balancer module 164 may create a new entry in lookup table 210, and store, in that entry, a flow key associated with the new data flow. Furthermore, netqueue load balancer module 164 may compute flow load indicator values for all data flows for which the counter values were retrieved from flow cache 142. Once the flow load indicator values are computed, netqueue load balancer module 164 may store the flow load indicator values in lookup table 210.

Merely to illustrate clear example, lookup table 210 includes the following flow load indicator values: "3" for a flow A, "1" for a flow B, "1" for a flow C, and "1" for a flow D.

Netqueue load balancer module 164 may be configured to distribute RSS engines to virtual machines based on flow load indicator values stored in lookup table 210. For example, based on the flow load indicator values and a count of flow filters that may be applied on the RSS engines, netqueue load balancer module 164 may determine whether any of the flow filters may be assigned, or reassigned, to particular RSS engines. An example process for distributing the RSS engines to data flows is described in FIG. 4.

Netqueue load balancer module 164 may also be configured to determine actions to be performed with respect to data flows. The actions may pertain to the types of processing that the data flow packets are to be subjected to as they are delivered to the destinations. Merely to illustrate clear examples, lookup table 210, depicted in FIG. 2, stores an action P for a flow A, an action Z for a flow B, an action R for a flow C, and an action T for a flow D.

Example Process for Computing Flow Load Indicator Values

Figures 3A, 3B:
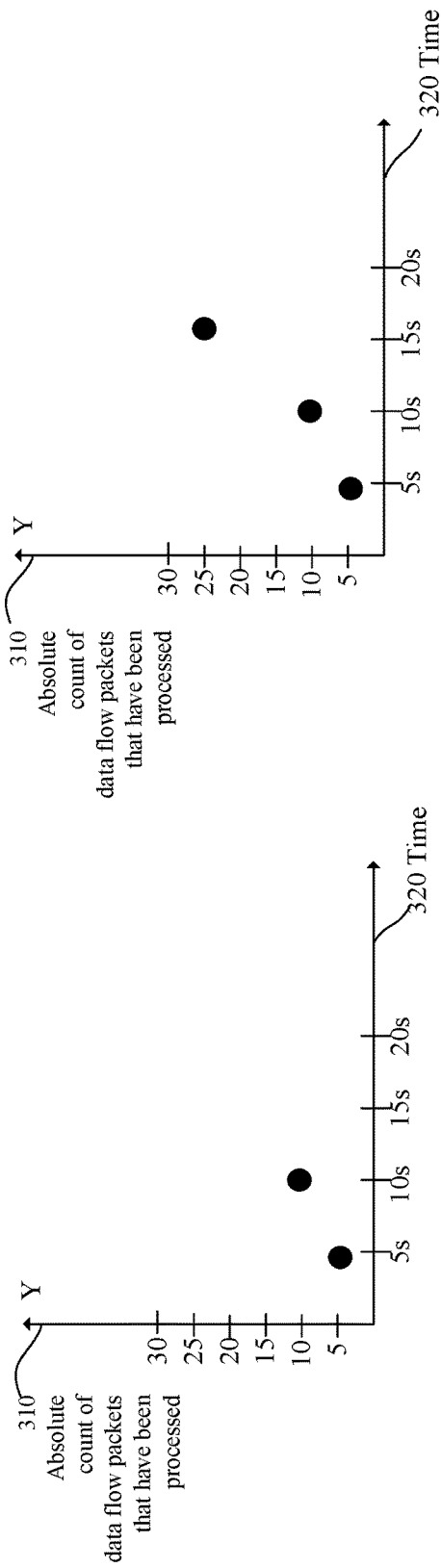
FIG. 3A depicts an example process for computing flow load indicator values.
FIG. 3B depicts an example process for computing flow load indicator values.

FIG. 3A-B depict examples of processes for computing flow load indicator values. The examples are provided merely to describe one of many implementations of the computation process for determining flow load indicator values.

A formula for computing flow load indicator values in examples of FIG. 3A-B is expressed as:

$$\text{Load}(n) = \text{Load}(n-1) * \tfrac{3}{4} + \text{Delta}(n) * \tfrac{1}{4} \qquad (1)$$

wherein Load (n) denotes a flow load indicator value at time n, and Load (n−1) denotes a flow load indicator value at time (n−1). Delta (n) is a difference between an absolute count of data flow packets that have been processed at time n and an absolute count of data flow packets that have been processed at time (n−1). Delta (n) is expressed as:

$$\text{Delta}(n)=Y(n)-Y(n-1). \quad (2)$$

wherein Y (n) denotes an absolute count of the data packets that have been processed at time n, and Y (n−1) denotes an absolute count of the data packets that have been processed at time (n−1).

Initially, at time n=0:

$$\text{If } Y(0)=0, \text{ then Load}(0)=0. \quad (3)$$

In FIG. 3A-B, the X axis plots time values, while the Y axis plots absolute counts of data flow packets that have been processed at given time slots. In the depicted examples, the absolute counts of the processed packet are monotonically increasing as the time values increase.

In the example depicted in FIG. 3A, a flow load indicator value computed at the time slot of 10 s is expressed as:

$$\text{Load(at 10 s)}=\text{Load(at 5 s)}*\tfrac{3}{4}+(Y(\text{at 10 s})-Y(\text{at 5 s}))*\tfrac{1}{4} \quad (4)$$

Since 5 s is the first sampling point, and there is no load history available prior to the time slot of 5 s, based on the values depicted in FIG. 3A, the flow load indicator value at the time slot of 5 s is:

$$\text{Load(at 5 s)}=Y(\text{at 5 s})*\tfrac{1}{4}=5/4=1.25. \quad (5)$$

Therefore, the flow load indicator value at the time slot of 10 s is:

$$\text{Load(at 10 s)}=5/4*\tfrac{3}{4}+(10-5)/4=2.1875. \quad (6)$$

In the example depicted in FIG. 3B, a flow load indicator value is computed at the time slot of 15 s, and is expressed as:

$$\text{Load(at 15 s)}=\text{Load(at 10 s)}*\tfrac{3}{4}+(Y(\text{at 15 s})-Y(\text{at 10 s}))*\tfrac{1}{4} \quad (7)$$

Using the values computed in the previous example and the Y value at 15 s;

$$\text{Load(at 15 s)}=2.1875*\tfrac{3}{4}+15*\tfrac{1}{4}=5.390625. \quad (8)$$

Assuming that both examples pertain to the same data flow, based on the flow load indicator values computed as depicted in FIG. 3A-B, it may be concluded that the load values have been increasing. Once they reach a particular threshold value, the filter corresponding to that data flow may be assigned to an RSS engine to improve the efficiency of the data flow processing.

Example Flow Chart for Dynamically Assigning RSS Queues to Data Flows

FIG. 4 depicts an example flow chart for dynamically assigning filters to RSS engines. The steps described in FIG. 4 may be performed by one or more components of a hypervisor. For example, the steps may be performed by netqueue load balancer module 164/1164 described in FIG. 1-2. Alternatively, the steps may be performed by other components integrated in, or cooperating with, hypervisor 164/1164. Merely to describe clear examples, the steps depicted in FIG. 4 are described in the context of the hypervisor.

In step 410, a hypervisor (or a netqueue load balancer module) retrieves, from flow cache, absolute counters for data flow packets that have been already processed by the hypervisor. The absolute counters may include the counts of all the processed data flows, and may be associated with respective time slots. Examples of absolute counter values plotted against time values are depicted in FIG. 3.

Once the netqueue load balancer module retrieves the counter values from the flow cache, the netqueue load balancer module uses the retrieved information to compute flow load indicator values for the corresponding data flows. Example approaches for computing the flow load indicator values are described in FIG. 3.

In step 420, the computed flow load indicator values are stored in a lookup table. The lookup table may include one or more table entries, and each entry may be associated with a data flow. Specifically, each entry may be used to store a flow key for a corresponding data flow, one or more action identifiers, and a flow load indicator value associated with the data flow. The flow key may be a data flow filter, a flow destination MAC address, or a flow identifier associated with the data flow. The one or more action identifiers may identify one or more actions that have been, or are to be performed, with respect to the corresponding data flow. The flow load indicator values may be the values computed by the netqueue load balancer module in step 410. An example of the lookup table is lookup table 210 described in FIG. 2.

In step 430, the lookup table is sorted. The sorting may be performed using different approaches. One of the approaches includes sorting the lookup table based on a descending order of the flow load indicator values. For example, an entry storing a data flow that is associated a highest flow load indicator value may be placed in the top row of the table, an entry storing a data flow that is associated with a lowest flow load indicator value may be placed in the bottom row of the table, and the remaining entries may be reordered in the descending order of the corresponding flow load indicator values. The resulting table is referred to as a sorted table.

In step 440, a count of filters that may be applied on RSS engines is determined. Typically, the count of filters depends on the hardware limitations of the host computer. The count of filters determined based on the hardware limitations may be provided to a netqueue load balancer module by a hypervisor or a central control plane module. In FIG. 4, the count of filters is denoted as N.

In step 450, a count of data flows that are included in the sorted table and for which flow load indicator values exceed a threshold value is determined. This may include counting the entries that are included in the sorted table and that have the load values exceeding the threshold value. In FIG. 4, the count of such data flows is referred to as M.

In step 460, a test is performed to determine whether the count "M" of the data flows exceeds the count "N" of filters that may be applied on RSS engines. If the test is satisfied, then step 470 is performed. Otherwise, step 490 is performed.

Step 470 is performed when the count "M" of data flows, which are included in the sorted table and for which flow load indicator values exceed the threshold value, exceeds the count "N" of filters that may be applied on RSS engines. In this step, N filters, that correspond to N data flows, which are stored in the sorted table and which have high flow load indicator values, are selected. The N filters are assigned to one or more RSS queues.

In step 480, the remaining filters, which correspond to the remaining data flows in the sorted table, are assigned to either non-RSS queues or default receive queues. Those filters, and corresponding data flows, are not paired with the RSS engines because only N filters could be applied on the RSS filters, and the N filters have been already assigned to the RSS engines. Most likely, the filters that have not been associated with the RSS engines do not have high flow load indicator values. Therefore, such filters are assigned to either non-RSS queues or to default receive queues, but not to the RSS engines.

Step 490 is performed when the count "M" of data flows, which are included in the sorted table and for which the flow load indicator values exceed the threshold value, does not exceed the count "N" of filters that can be applied on RSS engines. In this step, M filters are assigned to RSS queues, and some of the RSS queues may remain with no assigned filters.

The assignment of the filters to the RSS queues may be modified in a next cycle. The next cycle may start from performing the step 410 and the subsequent steps described in FIG. 4.

The netqueue load balancer module may be configured to repeat the steps described in FIG. 4 every time interval, which may be selected as 5 seconds, 10 seconds, or the like. Depending on the information provided by the flow cache to the netqueue load balancer module at the discrete times slots, the contents of the lookup table and the sorted table may be modified. If the tables are modified, then the assignment between the filters and the RSS engines may also change.

Example Flow Chart for Dynamically Assigning Data Flow Filters to RSS Engines

Figure 5:
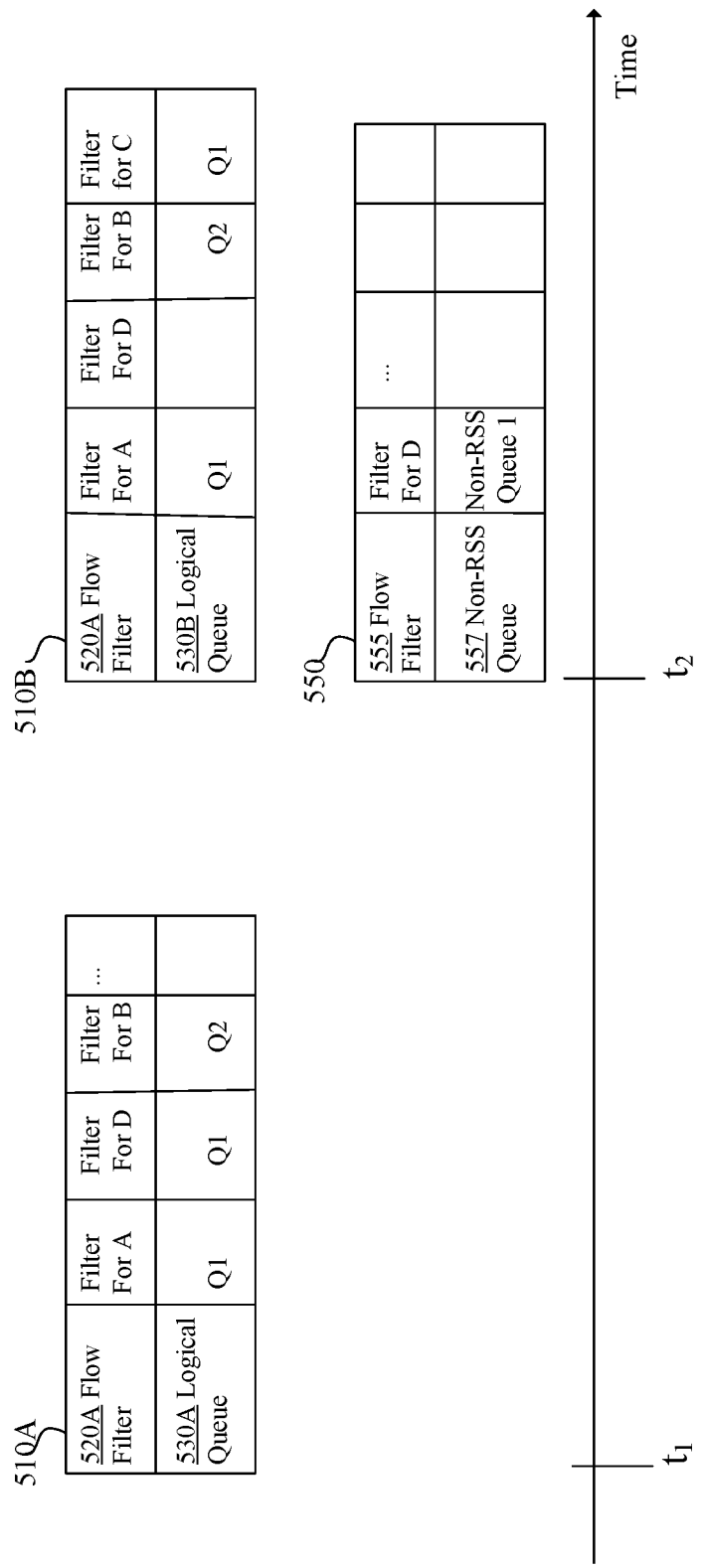
FIG. 5 depicts an example of dynamic assignment of filters to RSS engines.

FIG. 5 depicts an example of dynamic assignment of filters to RSS engines. Specifically, FIG. 5 depicts an example assignment of filters to RSS queues at time $t_1$, and an example assignment of filters to RSS queues at time t2. The example assignment at time $t_1$ is captured in an assignment data structure 510A. The example assignment at time t2 is captured in an assignment data structure 510B and a data structure 550. The examples are designed to demonstrate that the assignment of the filters to the RSS engines in data structure 510A at time $t_1$ may be modified at time t2, and may result in the assignment captured in data structure 510B and data structure 550 at time t2.

In FIG. 5, assignment data structure 510A includes a row 520A that lists data flow filters, including a flow A filter, a flow D filter, a flow B filter, and so forth. The filters may correspond to destination MAC addresses of the corresponding flows.

In FIG. 5, at time $t_1$, a logical queue 1 is assigned to the flow A filter and the flow D filter, and the logical queue 2 is assigned to the flow B filter. Other types of assignments may also be included in assignment structure 510A. Therefore, the flow A filter and the flow D filter are applied to an RSS engine that corresponds to the logical queue 1, whereas the flow B filter is applied to an RSS engine that corresponds to the logical queue 2.

Suppose that, at time t2, the netqueue load balancer module received new absolute counts for the flows A-B and D, and an absolute count for a data flow C. Suppose also that the netqueue load balancer module determined that a flow load indicator value computed for the data flow C is higher than a flow load indicator value computed for the data flow D. Assume also that a count of filters that may be assigned an RSS engine is "2." Therefore, assignment data structure 510A that was generated at time $t_1$ may be modified at time t2 to become assignment data structure 510B.

Assignment data structure 510B includes a row 520B that lists data flow filters, including the flow A filter, the flow D filter, the flow B filter, and a flow C filter. The filters may correspond to destination MAC addresses of the corresponding data flows. At time t2, a logical queue 1 is assigned to the flow A filter and the flow C filter, while the logical queue 2 is assigned to the flow B. Therefore, the flow A filter and the flow C filter are applied to an RSS engine that corresponds to the logical queue 1, whereas the flow B filter is applied to an RSS engine that corresponds to the logical queue 2. However, the flow D filter is not assigned to any logical queue. The flow D filter may be assigned to a non-RSS queue, as depicted data structure 550.

In data structure 550, a row 555 lists the flow D filter. Data structure 550 also includes a row 557, which list a non-RSS queue 1. Data flow D filter is assigned to the non-RSS queue 1.

The above examples illustrate a simple dynamic assignment and reassignment of data filters to RSS queues and non-RSS queues. The examples are not to be viewed as limiting in any way because additional logical queues, additional hardware pools and additional data flow filters may be depicted in data structures 510A-510B and 550.

Improvements Provided by the Described Embodiments

The approach presented herein improves the efficiency in directing data packets to their destinations. It allows to dynamically distribute RSS engines to virtual machines based on flow data. The approach allows to assign data flow filters to the RSS engines in a dynamic fashion by modifying the assignment of the filters to the RSS engines as data flow packets are processed. The approach is particularly useful when a large count of data packets of the same type data traffic is received in a short period of time causing a sudden increase of a CPU load of hardware queues that handle that data traffic. By modifying, in a dynamic fashion, the assignment of the filters to the RSS engines as the data packets are received, the loads experienced by the hardware queues may be rebalanced.

By retrieving, at discrete time intervals, absolute counts for data flows that have been already processed, and using the retrieved counts to determine corresponding flow load indicator values for the flows, an assignment between the data flow filters and RSS engines may be dynamically modified to improve the utilization of the CPU loads. This may allow reducing the CPU loads of the overloaded queues, and increasing the CPU loads of the underutilized hardware queues.

Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus, and used for storing information and software instructions to be executed by a processor. Main memory may also be used for storing temporary variables or other intermediate information during execution of software instructions to be executed by one or more processors.

General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method of dynamically distributing receive side scaling (RSS) engines to virtual machines based on flow data, the method comprising:
   receiving, from flow cache, one or more first absolute counts of data packets that belong to at least one data flow and that were processed within a first time interval;
   computing, based on the one or more first absolute counts, one or more flow load indicator values;
   storing the one or more flow load indicator values in a lookup table;
   generating a sorted table by sorting entries of the lookup table based on the one or more flow load indicator values;
   determining a first count that represents a count of one or more filters that can be applied on one or more RSS engines;
   determining a second count that represents a count of data flows that are included in the sorted table and that have corresponding flow load indicator values that exceed a threshold value;
   determining whether the second count exceeds the first count;
   in response to determining that the second count exceeds the first count:
      selecting, from the sorted table, the first count of one or more first data flows that have high flow load indicator values;
      determining the first count of one or more filters that correspond to the one or more first data flows;
      assigning the first count of the one or more filters to at least one RSS engine from the one or more RSS engines; and
      assigning one or more remaining filters, which correspond to one or more remaining data flows in the sorted table, to one or more non-RSS queues.

2. The method of claim 1, further comprising:
   in response to determining that the second count does not exceed the first count:
      selecting, from the sorted table, the second count of one or more second data flows that have high flow load indicator values;
      determining the second count of one or more filters that correspond to the one or more second data flows; and
      assigning the second count of the one or more filters to at least one RSS engine from the one or more RSS engines.

3. The method of claim 1, further comprising:
   receiving, from the flow cache, one or more second absolute counts of data packets that belong to at least one data flow and that were processed within a second-time interval;
   computing, based on the one or more first absolute counts and the one or more second absolute counts, one or more new flow load indicator values;
   storing the one or more new flow load indicator values in the lookup table;

wherein the storing of the one or more new flow load indicator values in the lookup table includes overwriting, for a particular data flow in the lookup table, a particular flow load indicator value with a new flow load indicator value from the one or more new flow load indicator values;

generating the sorted table by sorting entries of the lookup table based on the one or more new flow load indicator values;

determining the first count that represents the count of one or more filters that can be applied on the one or more RSS engines;

determining the second count that represents the count of data flows that are included in the sorted table and that have corresponding flow load indicator values that exceed the threshold value;

determining whether the second count exceeds the first count;

in response to determining that the second count exceeds the first count:
 selecting, from the sorted table, the first count of one or more data flows that have high flow load indicator values;
 determining the first count of one or more filters that correspond to the one or more data flows;
 assigning the first count of the one or more filters to at least one RSS engine from the one or more RSS engines; and
 assigning one or more remaining filters, which correspond to one or more remaining data flows in the sorted table, to the one or more non-RSS queues.

4. The method of claim 1, further comprising: sorting the entries of the lookup table based on a descending order from a data flow that has a highest flow load indicator value to a data flow that has a lowest flow load indicator value.

5. The method of claim 1, further comprising: retrieving the one or more first absolute counts of data packets from the flow cache by a netqueue layer of a hypervisor; and wherein the flow cache is implemented in the hypervisor.

6. The method of claim 1, further comprising: assigning the first count of the one or more filters to the at least one RSS engine by configuring an action callback in a hypervisor.

7. The method of claim 1, wherein the one or more filters correspond to one or more destination MAC addresses included in corresponding one or more data packets.

8. One or more non-transitory computer-readable storage media storing one or more computer instructions which, when executed by one or more processors, cause the one or more processors to perform:
 receiving, from flow cache, one or more first absolute counts of data packets that belong to at least one data flow and that were processed within a first-time interval;
 computing, based on the one or more first absolute counts, one or more flow load indicator values;
 storing the one or more flow load indicator values in a lookup table;
 generating a sorted table by sorting entries of the lookup table based on the one or more flow load indicator values;
 determining a first count that represents a count of one or more filters that can be applied on one or more RSS engines;
 determining a second count that represents a count of data flows that are included in the sorted table and that have corresponding flow load indicator values that exceed a threshold value;
 determining whether the second count exceeds the first count;
 in response to determining that the second count exceeds the first count:
  selecting, from the sorted table, the first count of one or more first data flows that have high flow load indicator values;
  determining the first count of one or more filters that correspond to the one or more first data flows;
  assigning the first count of the one or more filters to at least one RSS engine from the one or more RSS engines; and
  assigning one or more remaining filters, which correspond to one or more remaining data flows in the sorted table, to one or more non-RSS queues.

9. The one or more non-transitory computer-readable storage media of claim 8, storing additional instructions which, when executed by the one or more processors, cause the one or more processors to perform:
 in response to determining that the second count does not exceed the first count:
  selecting, from the sorted table, the second count of one or more second data flows that have high flow load indicator values;
  determining the second count of one or more filters that correspond to the one or more second data flows; and
  assigning the second count of the one or more filters to at least one RSS engine from the one or more RSS engines.

10. The one or more non-transitory computer-readable storage media of claim 8, storing additional instructions which, when executed by the one or more processors, cause the one or more processors to perform:
 receiving, from the flow cache, one or more second absolute counts of data packets that belong to at least one data flow and that were processed within a second-time interval;
 computing, based on the one or more first absolute counts and the one or more second absolute counts, one or more new flow load indicator values;
 storing the one or more new flow load indicator values in the lookup table;
 wherein the storing of the one or more new flow load indicator values in the lookup table includes overwriting, for a particular data flow in the lookup table, a particular flow load indicator value with a new flow load indicator value from the one or more new flow load indicator values;
 generating the sorted table by sorting entries of the lookup table based on the one or more new flow load indicator values;
 determining the first count that represents the count of one or more filters that can be applied on the one or more RSS engines;
 determining the second count that represents the count of data flows that are included in the sorted table and that have corresponding flow load indicator values that exceed the threshold value;
 determining whether the second count exceeds the first count;
 in response to determining that the second count exceeds the first count:

selecting, from the sorted table, the first count of one or more data flows that have high flow load indicator values;

determining the first count of one or more filters that correspond to the one or more data flows;

assigning the first count of the one or more filters to at least one RSS engine from the one or more RSS engines; and assigning one or more remaining filters, which correspond to one or more remaining data flows in the sorted table, to the one or more non-RSS queues.

11. The one or more non-transitory computer-readable storage media of claim 8, storing additional instructions which, when executed by the one or more processors, cause the one or more processors to perform:

sorting the entries of the lookup table based on a descending order from a data flow that has a highest flow load indicator value to a data flow that has a lowest flow load indicator value.

12. The one or more non-transitory computer-readable storage media of claim 8, storing additional instructions which, when executed by the one or more processors, cause the one or more processors to perform:

retrieving the one or more first absolute counts of data packets from the flow cache by a netqueue layer of a hypervisor; and wherein the flow cache is implemented in the hypervisor.

13. The one or more non-transitory computer-readable storage media of claim 8, storing additional instructions which, when executed by the one or more processors, cause the one or more processors to perform:

assigning the first count of the one or more filters to the at least one RSS engine by configuring an action callback in a hypervisor.

14. The one or more non-transitory computer-readable storage media of claim 8, wherein the one or more filters correspond to one or more destination MAC addresses included in corresponding one or more data packets.

15. A system configured to dynamically provision multiple receive side scaling (RSS) engines, the system comprising:

one or more processors;

one or more memory units; and one or more non-transitory computer-readable storage media storing one or more computer instructions which, when executed by the one or more processors, cause the one or more processors to perform:

receiving, from flow cache, one or more first absolute counts of data packets that belong to at least one data flow and that were processed within a first-time interval;

computing, based on the one or more first absolute counts, one or more flow load indicator values;

storing the one or more flow load indicator values in a lookup table;

generating a sorted table by sorting entries of the lookup table based on the one or more flow load indicator values;

determining a first count that represents a count of one or more filters that can be applied on one or more RSS engines;

determining a second count that represents a count of data flows that are included in the sorted table and that have corresponding flow load indicator values that exceed a threshold value;

determining whether the second count exceeds the first count;

in response to determining that the second count exceeds the first count:

selecting, from the sorted table, the first count of one or more first data flows that have high flow load indicator values;

determining the first count of one or more filters that correspond to the one or more first data flows;

assigning the first count of the one or more filters to at least one RSS engine from the one or more RSS engines; and assigning one or more remaining filters, which correspond to one or more remaining data flows in the sorted table, to one or more non-RSS queues.

16. The system of claim 15, wherein the one or more non-transitory computer-readable storage media store additional instructions which, when executed by the one or more processors, cause the one or more processors to perform:

in response to determining that the second count does not exceed the first count:

selecting, from the sorted table, the second count of one or more second data flows that have high flow load indicator values;

determining the second count of one or more filters that correspond to the one or more second data flows; and assigning the second count of the one or more filters to at least one RSS engine from the one or more RSS engines.

17. The system of claim 15, wherein the one or more non-transitory computer-readable storage media store additional instructions which, when executed by the one or more processors, cause the one or more processors to perform:

receiving, from the flow cache, one or more second absolute counts of data packets that belong to at least one data flow and that were processed within a second-time interval;

computing, based on the one or more first absolute counts and the one or more second absolute counts, one or more new flow load indicator values;

storing the one or more new flow load indicator values in the lookup table;

wherein the storing of the one or more new flow load indicator values in the lookup table includes overwriting, for a particular data flow in the lookup table, a particular flow load indicator value with a new flow load indicator value from the one or more new flow load indicator values;

generating the sorted table by sorting entries of the lookup table based on the one or more new flow load indicator values;

determining the first count that represents the count of one or more filters that can be applied on the one or more RSS engines;

determining the second count that represents the count of data flows that are included in the sorted table and that have corresponding flow load indicator values that exceed the threshold value;

determining whether the second count exceeds the first count;

in response to determining that the second count exceeds the first count:

selecting, from the sorted table, the first count of one or more data flows that have high flow load indicator values;

determining the first count of one or more filters that correspond to the one or more data flows;

assigning the first count of the one or more filters to at least one RSS engine from the one or more RSS engines; and assigning one or more remaining filters, which correspond to one or more remaining data flows in the sorted table, to the one or more non-RSS queues.

18. The system of claim 15, wherein the one or more non-transitory computer-readable storage media store additional instructions which, when executed by the one or more processors, cause the one or more processors to perform:

sorting the entries of the lookup table based on a descending order from a data flow that has a highest flow load indicator value to a data flow that has a lowest flow load indicator value.

19. The system of claim 15, wherein the one or more non-transitory computer-readable storage media store additional instructions which, when executed by the one or more processors, cause the one or more processors to perform:

retrieving the one or more first absolute counts of data packets from the flow cache by a netqueue layer of a hypervisor; and wherein the flow cache is implemented in the hypervisor.

20. The system of claim 15, wherein the one or more non-transitory computer-readable storage media store additional instructions which, when executed by the one or more processors, cause the one or more processors to perform:

assigning the first count of the one or more filters to the at least one RSS engine by configuring an action callback in a hypervisor.

* * * * *